United States Patent [19]

Uchiyama

[11] Patent Number: 5,765,054
[45] Date of Patent: Jun. 9, 1998

[54] FOCAL DETECTION AND ADJUTMENT DEVICE AND METHOD

[75] Inventor: Shigeyuki Uchiyama, Setagaya, Japan

[73] Assignee: Nikon Corporation, Tokyo, Japan

[21] Appl. No.: 826,652

[22] Filed: Apr. 7, 1997

Related U.S. Application Data

[60] Provisional application No. 60/038,410, Feb. 18, 1997.

[30] Foreign Application Priority Data

Jun. 21, 1996 [JP] Japan .................................. 8-161749

[51] Int. Cl.$^6$ .................................................. G03B 13/36
[52] U.S. Cl. .......................... 396/100; 396/104; 396/124; 396/128
[58] Field of Search ............................. 396/92, 100, 104, 396/124, 123, 128; 250/201.2, 201.7, 201.8

[56] References Cited

U.S. PATENT DOCUMENTS

| | | | |
|---|---|---|---|
| 5,485,004 | 1/1996 | Suzuki et al. | 250/201.8 X |
| 5,523,553 | 6/1996 | Kusaka et al. | 250/201.8 |
| 5,615,399 | 3/1997 | Akashi et al. | 396/128 |

FOREIGN PATENT DOCUMENTS

A-60-37513 2/1985 Japan.

*Primary Examiner*—W. B. Perkey
*Attorney, Agent, or Firm*—Oliff & Berridge, PLC

[57] ABSTRACT

The invention eliminates field mask eclipse related to a focal detection apparatus that uses a phase variation detection method, and provides an adjustment device and method for the focal detection apparatus. The focal detection apparatus includes a field mask; a separator optical system that divides and forms a set of light images of a beam of light transmitted through the field mask; an image sensor that photoelectrically converts light images from the separator optical system; a light-receiving area memory device; a masking device that masks the photoelectric output of the image sensor according to the light-receiving areas written into the light-receiving area memory device; and a focal computation device that computes a defocusing amount from the photoelectric output masked by the masking device. The adjustment device and method writes into the light-receiving area memory device the light-receiving areas not incurring optical eclipse when uniform illumination is projected onto the image sensor via the field mask and the separator optical system.

7 Claims, 15 Drawing Sheets

FOCAL DETECTION AND ADJUSTMENT DEVICE AND METHOD

BACKGROUND OF THE INVENTION

This non-provisional application claims the benefit of U.S. Provisional application No. 60/038,410, filed Feb. 18, 1997, entitled "Focal Detection and Adjustment Device and Method" by Shigeyuki UCHIYAMA (Attorney Docket No. JAO 32380).

1. Field of Invention

The present invention relates to a focal detection apparatus that uses a phase variation detection method and an adjustment method that properly sets the light-receiving areas of the focal detection apparatus.

2. Description of Related Art

In the past, there have been known focal detection apparatuses in cameras that use the phase variation detection method. FIG. 10 shows the internal structure of this type of focal detection apparatus.

In FIG. 10, along the optical axis of the photographic optical system 90 are positioned in sequence a field mask 91, a field lens 92, a diaphragm mask 93, a lens plate 94 and an image sensor 95. The output of the image sensor 95 is sent to a microprocessor 21. A rectangular aperture is provided in the field mask 91 that blocks excess light by being positioned in the vicinity of the primary image-forming surface (predefined focal surface) of the photographic optical system 90.

The diaphragm mask 93 has two apertures 93a and 93b. The lens plate 94 has a pair of lenses 94a and 94b corresponding to the apertures 93a and 93b of the diaphragm mask 93. The lenses 94a and 94b form a set of light images. The set of light images formed by the photographic optical system 90 is photoelectrically converted by light-receiving element arrays 95a and 95b, and then is output in sequence as a series of output signals.

Next, the focal detection computations performed by the microprocessor 21 are explained. The light-receiving element arrays 95a and 95b output the series of output signals, a[1], . . . , a[n] and b[1], . . . , b[n], respectively. The series of output signals a[i] and b[i], are used to determine the correlation C[L] according to Equation (1) as follows:

$$C[L] = \sum_{i=k}^{r} |a[i+L] - b[i]| \qquad (1)$$

where L=−Lmax . . . −1,0,1 . . . Lmax. The initial element k and final element r of i of Equation (1) are determined using Equations (2)–(5) as follows:

When L≧0, $k=k0+INT\{-L/2\}$ (2)

$r=r0+INT\{-L/2\}$ (3)

When L<0, $k=k0+INT\{(-L+1)/2\}$ (4)

$r=r0+INT\{(-L+1)/2\}$ (5)

"INT" in the above equations is the result of computation discarding the part following the decimal point. Also, k0 and r0 are the initial value and final value when the shift L is zero. The movements of such an initial value and final value are shown in FIG. 12.

The microprocessor 21 seeks the shift L providing the minimum value regarding the correlation C[L]. The shift corresponds to the amount of shift of the set of light images. The defocusing amount DF is computed by multiplying a conversion coefficient by the shift.

The correlation C[L] is a discrete value as shown in FIG. 11(c). Thus, a quantization error occurs in the detected value of the defocusing amount. Therefore, in Japanese Laid-Open Patent No. 60-37513, which is hereby incorporated by reference, the present Applicants have provided a device that computes the correct defocusing amount by performing supplemental computations regarding the discrete correlation C[L].

For example, the minimum correlation C[Le] and the correlations C[Le+1] and C[Le−1], shown in FIG. 13, are used to compute DL, the true minimum value Cex, E and the true amount of shift Ls as follows:

$DL=(C[Le-1]-C[Le+1])/2$ (6)

$Cex=C[Le]-|DL|$ (7)

$E=MAX(C[Le+1]-C[Le], C[Le-1]-C[Le])$ (8)

$Ls=Le+DL/E$ (9)

Then, the correct defocusing amount DF is computed by multiplying the conversion coefficient Kf by the true amount of shift Ls according to Equation (10) as follows:

$DF=Kf \cdot Ls$ (10)

Then, driving of the photographic optical system 90 and focal adjustment are performed based on the defocusing amount calculated as discussed above.

When the focal detection apparatus is assembled correctly, as shown in FIG. 14(a), the image MI of the field mask 91 is formed correctly in relation to the light-receiving element arrays 95a and 95b. As a result, as shown in FIG. 15(a), lost portions do not occur in the photoelectric output. However, if there occurs a slight error in the assembly of the focal detection apparatus, as shown in FIG. 14(b), the light image MI is formed shifted in relation to the light-receiving element arrays. As a result, as shown in FIG. 15(b), portions of the photoelectric output corresponding to the areas of the light-receiving element arrays 95a and 95b away from which the image MI of the field mask 91 has shifted are lost.

In particular, if the image of the photographic optical system 90 is formed shifted with respect to the field mask 91, the edge of the light image MI becomes unclear, and the number of photoelectrically converted pixels having a decreased output is increased. Also, the light image MI forms shifted on the light-receiving element arrays 95a and 95b, and a shadowing phenomenon (henceforth called "field mask eclipse") occurs.

For the photoelectrically converted pixels of the area causing the field mask eclipse, because the output cannot be obtained corresponding to the set of light images, their use in the focal detection computations is not desirable. The causes of such field mask eclipses and their generative conditions are explained below.

The first cause is the misplacement of the field mask 91. For example, when the field mask has been placed shifted upward vis-à-vis FIG. 10 during assembly of the focal detection unit, the set of light images is formed shifted downward.

FIG. 16(a) shows the field mask eclipse of the case described above. That is, the light-receiving element array 95a (solid line in the drawing) and the output of the light-receiving element array 95b (dotted line in the drawing) have lost portions of their output occurring in the same direction according to the shift of the field mask 91.

The second cause of field mask eclipses is the shifting of the components, which changes the distances between the field mask 91, field lens 92, diaphragm mask 93, lens plate 94, or image sensor 95, for example. Where such shifting occurs, the set of light images may be separated more or less than planned, the edges of the light images may blur more than desired, or the light images may be formed smaller than planned.

If the distance between the set of light images is changed, as shown in FIG. 16(b), lost portions of output occur in mutually different directions with respect to the light-receiving element arrays 95a and 95b. Also, when the edges of the set of light images blur, or the set of light images is formed smaller than planned, as shown in FIG. 16(c), lost portions of output occur at both ends of the light-receiving element arrays 95a and 95b.

There are various other possible causes of field mask eclipses, such as misplacement of the focal detection unit, and fabrication errors of the field mask 91, lens plate 94, et cetera.

In the conventional focal detection apparatuses, the following types of measures have been implemented in order to prevent such field mask eclipses.

(1) Expand the aperture of the field mask 91.
(2) Increase the precision of the component holders to suppress shifting of the field mask 91 and the components, thereby preventing changes in the distances between the components.
(3) Increase the precision of fabrication regarding the shape of the aperture of the field mask 91.
(4) Assemble more carefully to suppress shifting of the field mask 91 and the components with respect to each other.
(5) Uniformly contract the range of pixels used in the light-receiving element arrays 95a and 95b.

Nevertheless, in the conventional measures, there have occurred the following types of problems. That is, when the aperture of the field mask 91 is expanded, harmful stray light is generated inside the focal detection apparatus. The stray light causes an increase in size of the set of light images in relation to each other and the set of light images intrude into each other's respective light-receiving element array. This reduces the precision of focal detection, and in some cases focal detection becomes impossible.

When the precision of fabrication of the components is increased, the yield of the components decreases, while the costs of the components increases. When the precision of assembly of the components is raised, advanced technology and time are required for assembly.

When the range of used pixels is contracted, the focal detection area becomes needlessly narrow. Also, because the range of used pixels is narrow, the maximum shift extent Lmax is limited to too small a value, and the scope of detection of the defocusing amount is narrowed indiscriminately.

SUMMARY OF THE INVENTION

In view of the foregoing problems with the conventional apparatuses, the invention provides a focal detection apparatus and method for a photographic optical system and an adjustment device and method therefor that can eliminate the harm caused by field mask eclipse.

The invention may include a field mask that blocks light outside of a focal detection area and which is positioned in the vicinity of a primary image-forming surface of the photographic optical system; a separator optical system that divides a pupil of a beam of light transmitted through the field mask and that separately forms a set of light images of the divided beam of light; an image sensor that converts the set of light images formed via the separator optical system into a photoelectric output, the image sensor including a plurality of light-receiving areas; a light-receiving area memory device into which is written light-receiving areas not incurring optical eclipse when uniform illumination is projected onto the image sensor via the field mask and the separator optical system; a masking device that masks the photoelectric output of the image sensor according to the information of the light-receiving areas written into the light-receiving area memory device; and a focal computation device that detects a phase variation on the light-receiving areas related to the photoelectric output processed by the masking device and that computes a defocusing amount based on the phase variation.

The invention further provides an adjustment device method for use with the focal detection apparatus for a photographic optical system where the photographic optical system may include a field mask that blocks light outside of a focal detection area and which is positioned in the vicinity of a primary image-forming surface of the photographic optical system; a separator optical system that divides a pupil of a beam of light transmitted through the field mask and that separately forms a set of light images of the divided beam of light; an image sensor that converts a set of light images formed via the separator optical system into a photoelectric output, the image sensor comprising a plurality of light-receiving areas; a light-receiving area memory device; and a focal computation device that detects phase variation on the light receiving areas related to the set of light images photoelectrically converted by the image sensor and that computes a defocusing amount based on that phase variation. The method includes projecting uniform illumination onto the image sensor via the field mask and the separator optical system, and then determining via a controller the light-receiving areas not incurring optical eclipse based on the photoelectric output of the image sensor. Those areas are recorded in the light-receiving area memory device as the light-receiving areas of the image sensor via a recorder.

At the time of manufacturing or maintenance of the camera, the light-receiving areas not incurring optical eclipse when uniform illumination is projected onto the image sensor via the field mask and the separator optical system are written independently into the light-receiving area memory device.

The masking device masks the photoelectric output of the image sensor according to the light-receiving areas independently written into the light-receiving area memory device.

The focal computation device performs computation of the defocusing amount regarding the photoelectric output having its effective range restricted in this manner. Therefore, the defocusing amount can be computed assuredly based on the independent light-receiving areas not incurring optical eclipse.

The adjustment method of the focal detection apparatus is executed by the following means.

First, uniform illumination is projected onto the image sensor via the field mask and the separator optical system. The uniform illumination may be projected via the lens mount, or photographic optical system of the camera where the focal detection apparatus is built into the camera. Also, the uniform illumination may be projected directly onto the focal detection apparatus where at least the field mask, separator optical system, and image sensor are fixed in the focal detection unit.

In such a state, the photoelectric output of the image sensor is read, and the light-receiving areas of the light-receiving surface not incurring optical eclipse are sought directly from the patterns of the photoelectric output. These areas are established as the light-receiving areas of the image sensor. The focal detection apparatus adjusted in this manner can compute assuredly the defocusing amount according to the light-receiving areas not having field mask eclipse.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
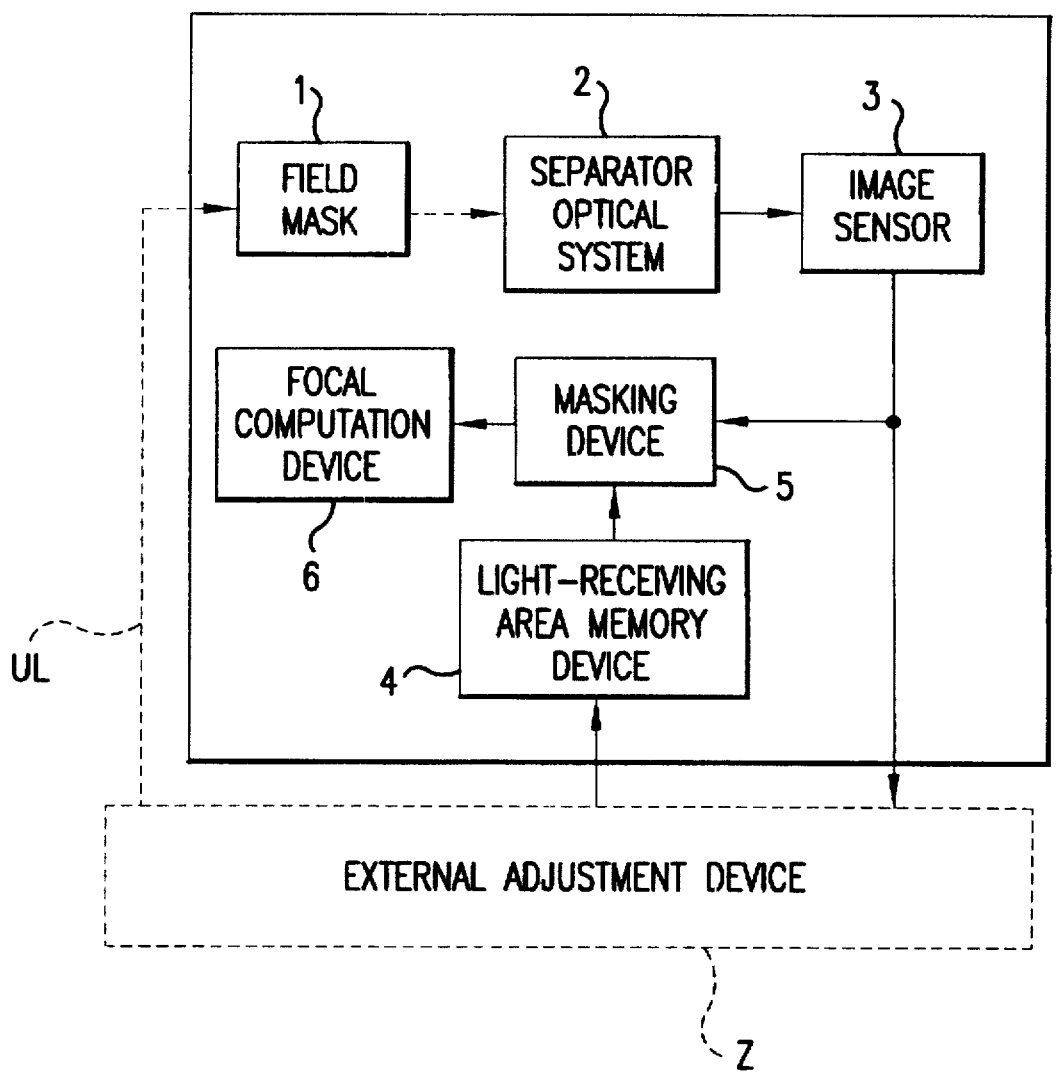
FIG. 1 is a block diagram of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

Figure 2:
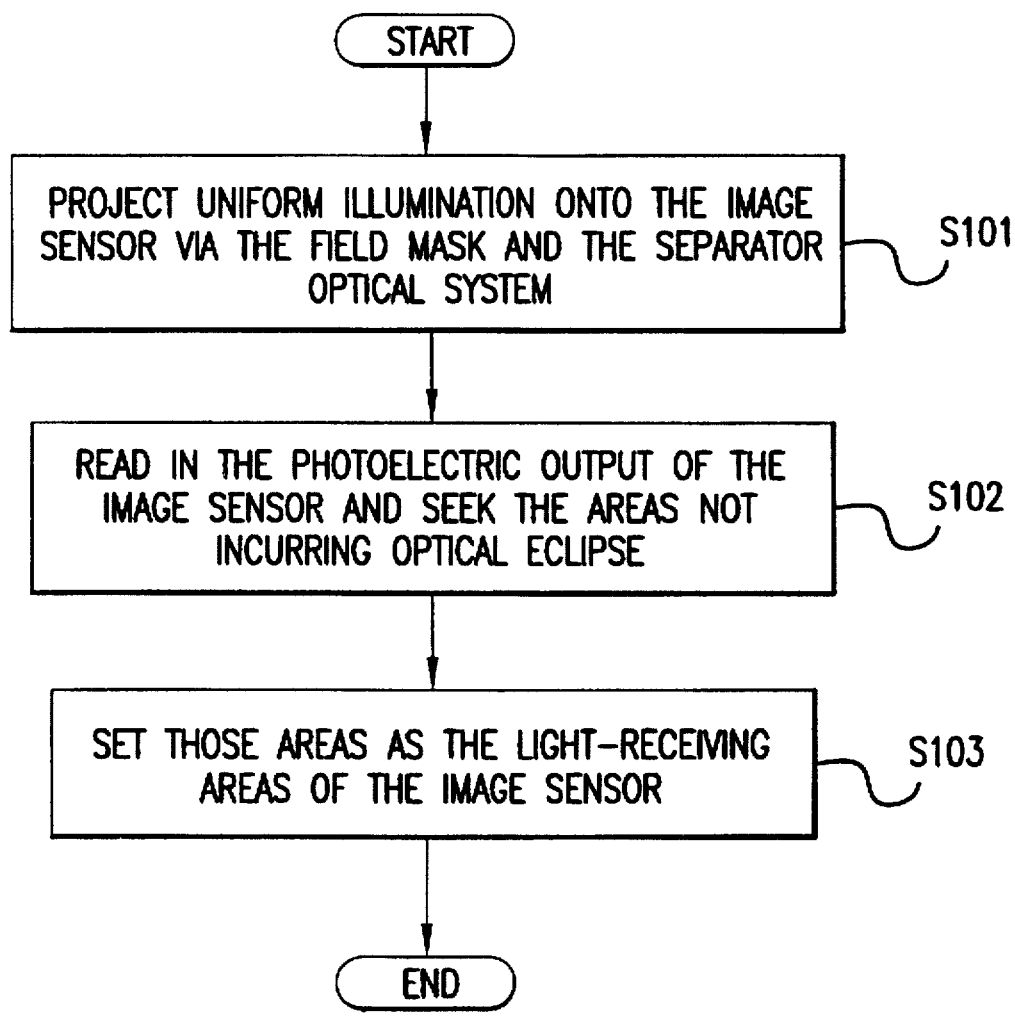
FIG. 2 is a flow chart that explains the operation of the invention.
Figure 3:
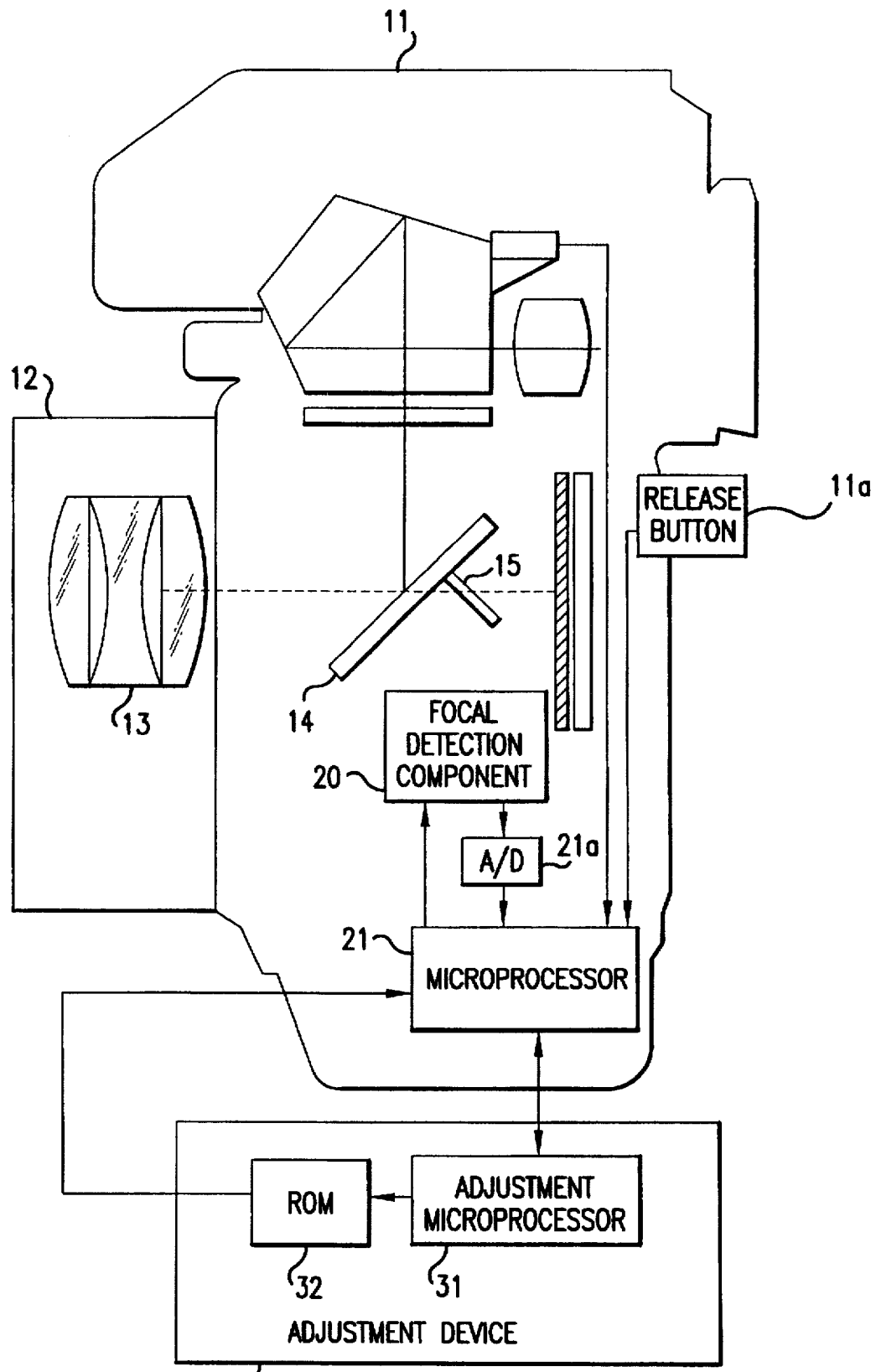
FIG. 3 shows the structure of a preferred embodiment of the invention.
Figure 4:
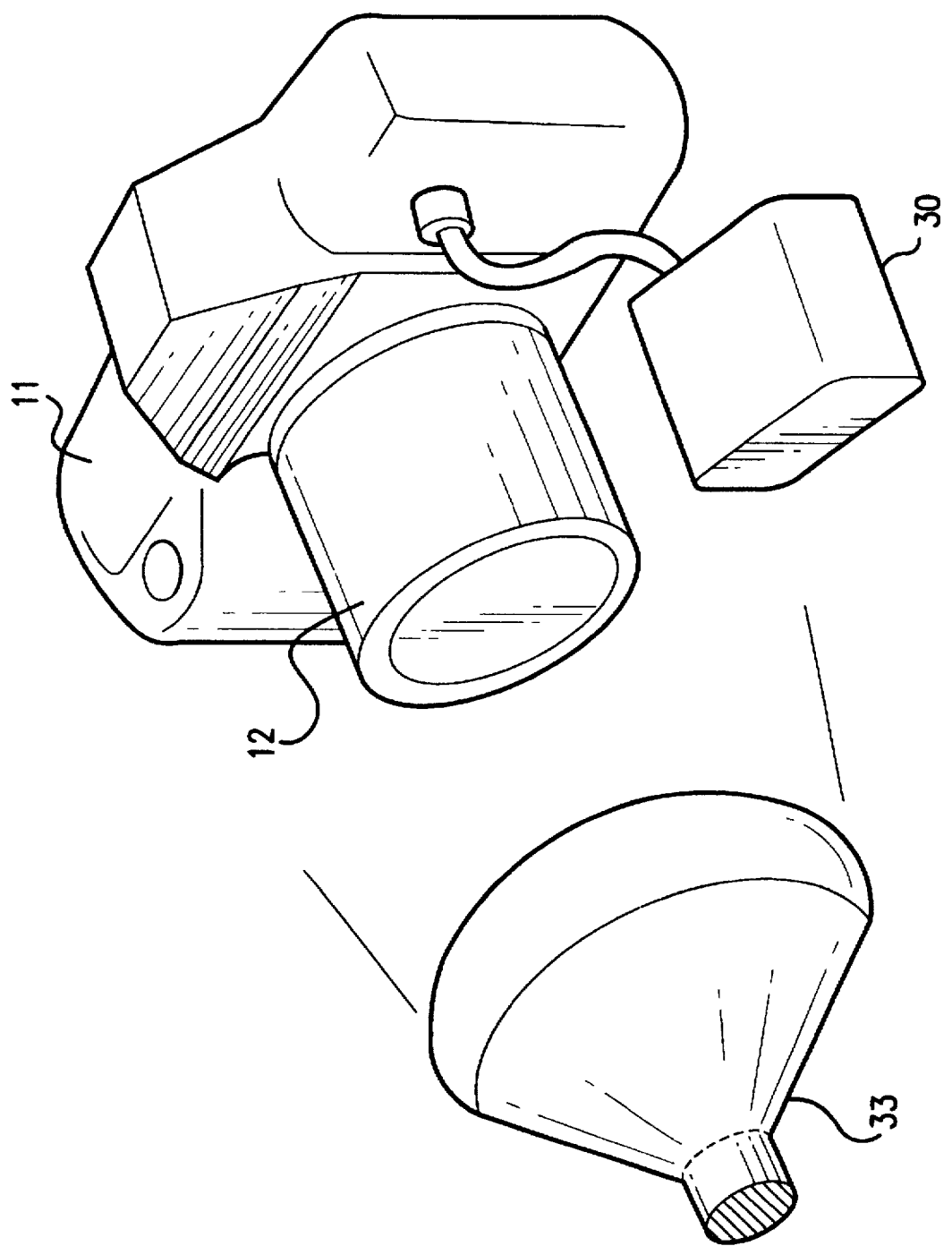
FIG. 4 shows the structure for adjustment.

FIG. 1 is a block diagram of the invention. FIG. 2 is a flow chart that explains the operation of the invention. FIG. 3 shows the structure of a preferred embodiment of the invention. FIG. 4 shows the configuration during adjustment.

In FIGS. 3 and 4, a lens barrel 12 is attached to a camera body 11, a photographic optical system 13 is located inside the lens barrel 12.

On the optical axis of the photographic optical system 13 are placed in sequence an image mirror 14 and a sub-mirror 15. A focal detection component 20 is placed adjacent the sub-mirror in a reflective direction. The photoelectric output of the focal detection component 20 is provided to a microprocessor 21 via an A/D converter 21a. Also, a release button 11a is connected to the microprocessor 21.

The microprocessor 21 is connected to an external adjustment device 30 via a connector terminal provided on the camera body 11. Inside the adjustment device 30 are placed an adjustment microprocessor 31 and a ROM writer 32. Also, an illumination device 33 is located on the front of the camera body 11.

Figure 10:
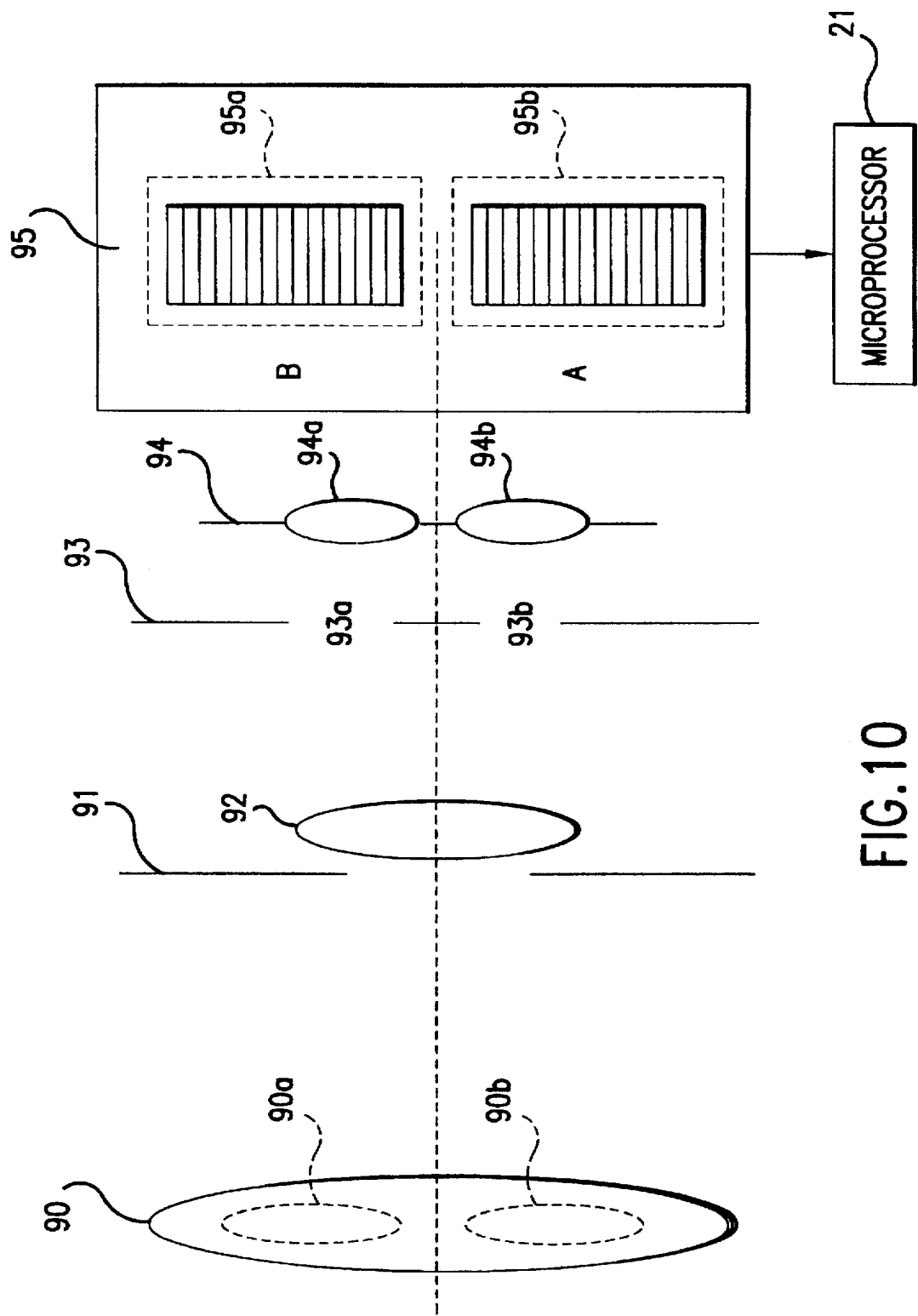
FIG. 10 shows internal structure of a conventional focal detection component.
Figure 11A:
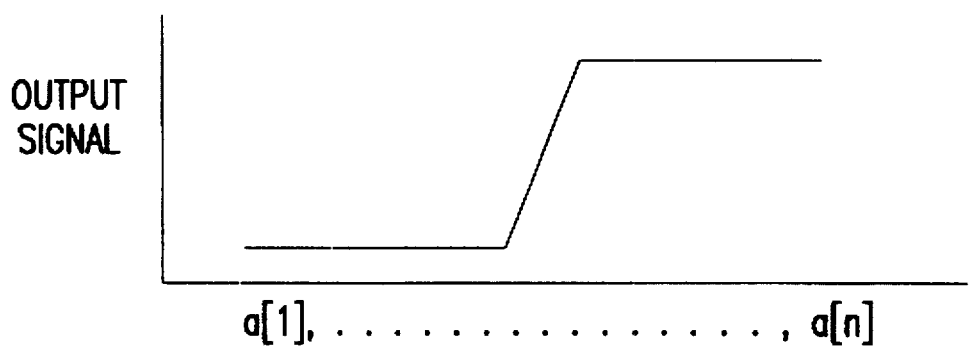
FIGS. 11(A)-11(C) are graphs that show output signals of a light-receiving element array and correlation with respect to shift of the focal detection component of FIG. 10.
Figure 11B:
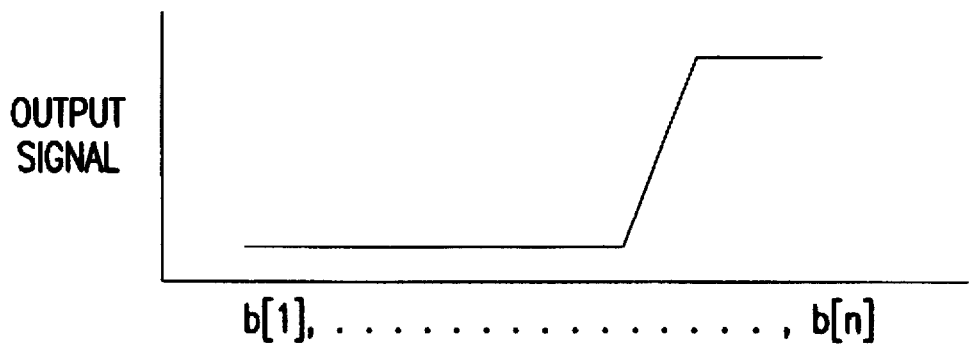
Figure 11C:
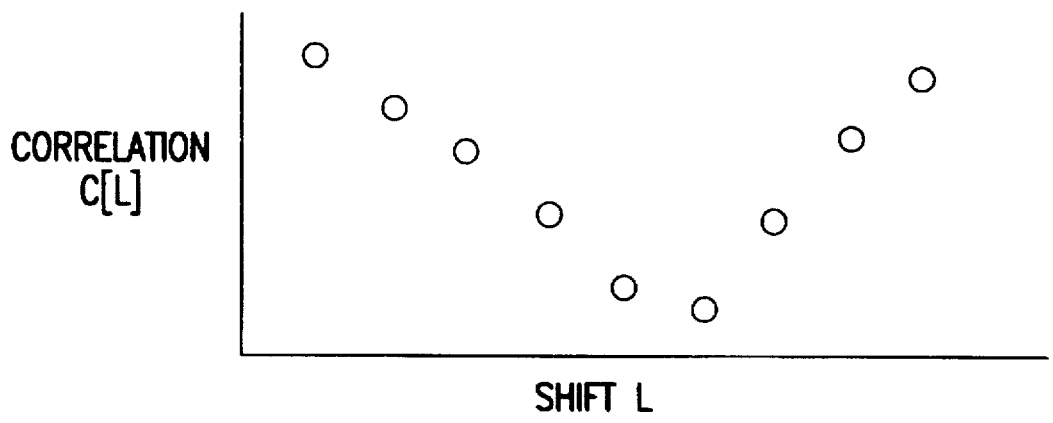
Figure 12A:
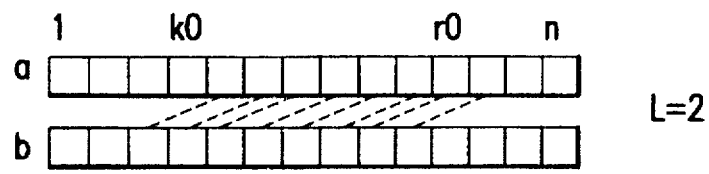
FIGS. 12(A)-12(E) show change of the initial element k and the final element r accompanying a change of the shift L.
Figure 12B:
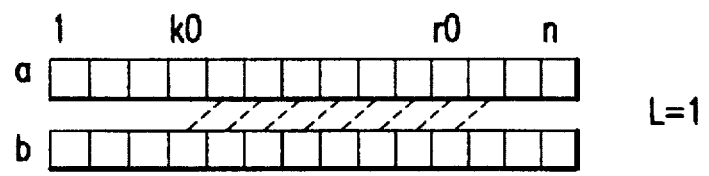
Figure 12C:
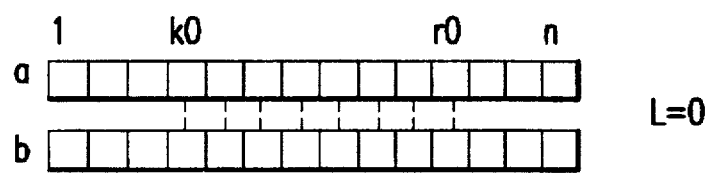
Figure 12D:
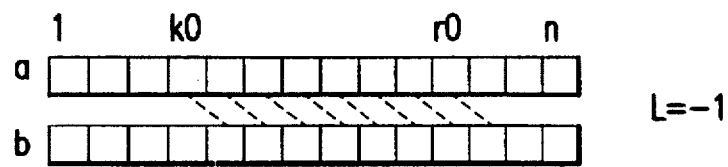
Figure 12E:
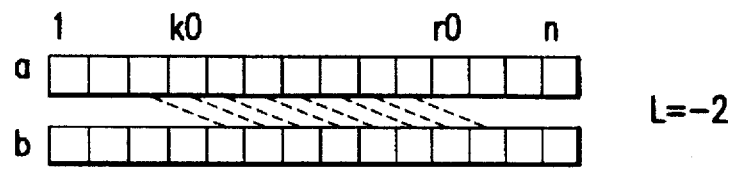
Figure 13:
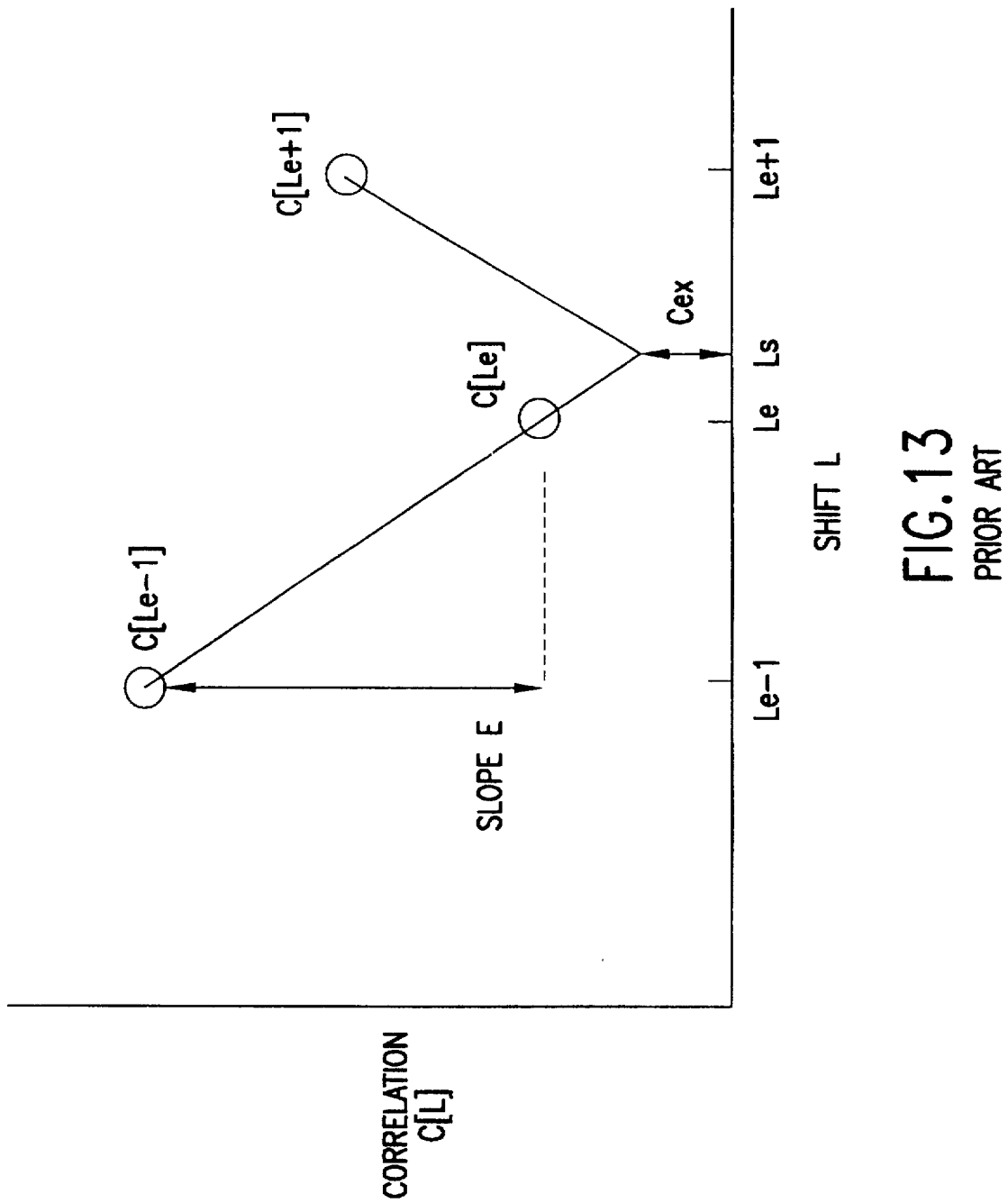
FIG. 13 shows a correlation computation.
Figure 14A:
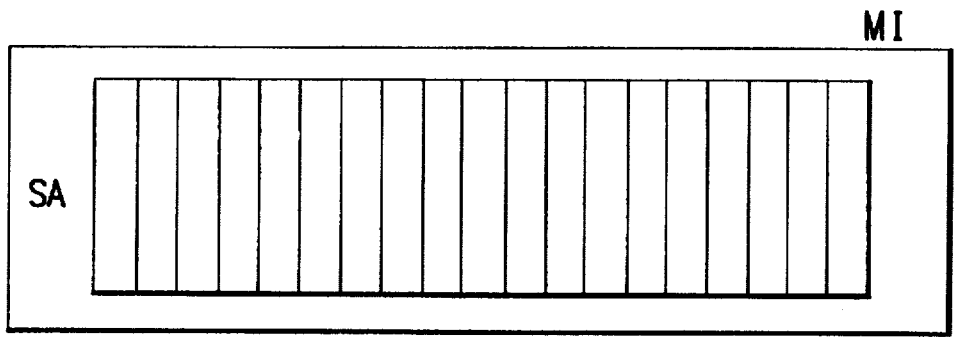
FIG. 14(A)-14(B) show field mask eclipse.
Figure 14B:
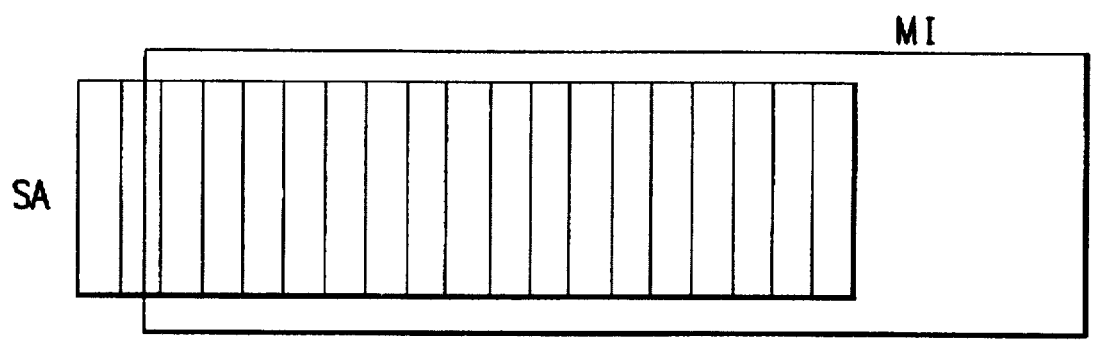
Figure 15A:
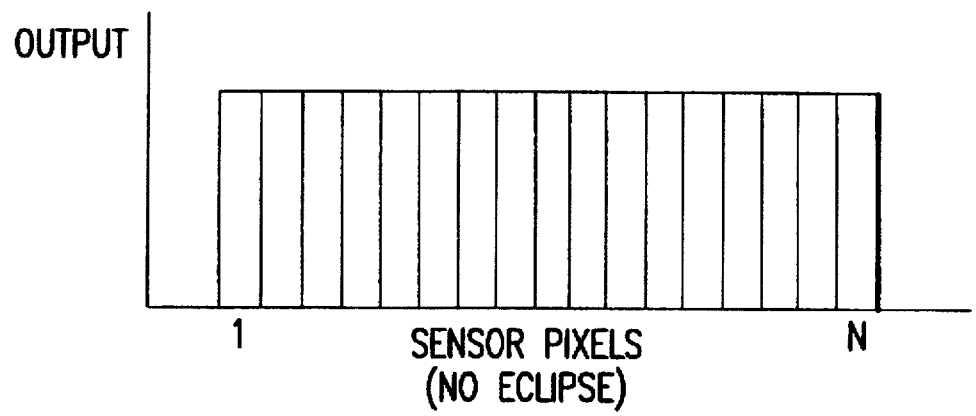
FIG. 15(A)-15(B) show output signals of the light-receiving element array having incurred field mask eclipse.
Figure 15B:
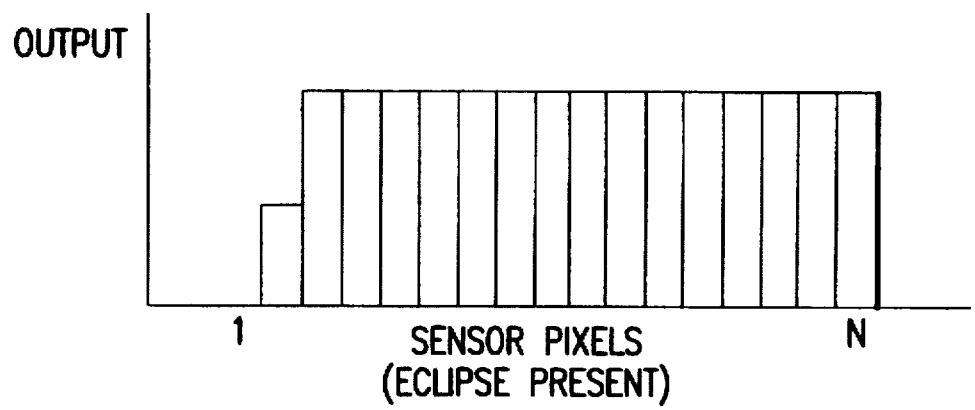
Figure 16A:
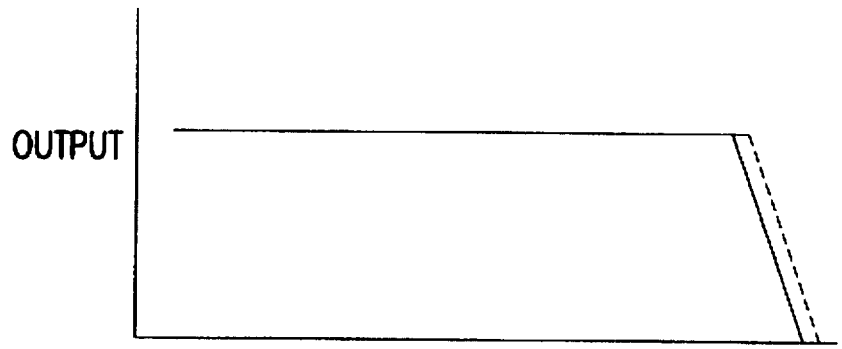
FIGS. 16(A)-16(C) show changes in the effective pixel range due to field mask eclipse.
Figure 16B:
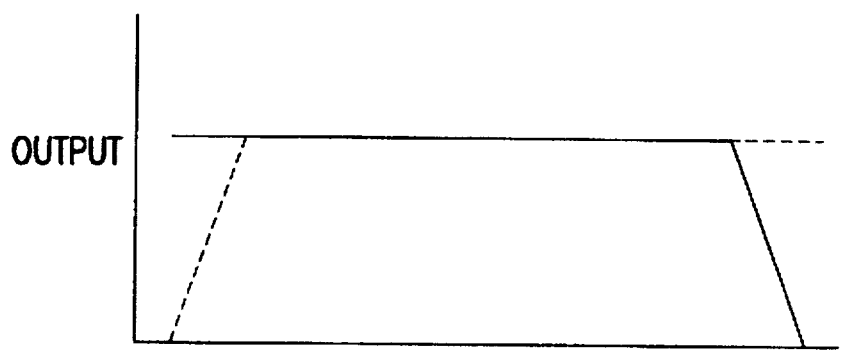
Figure 16C:
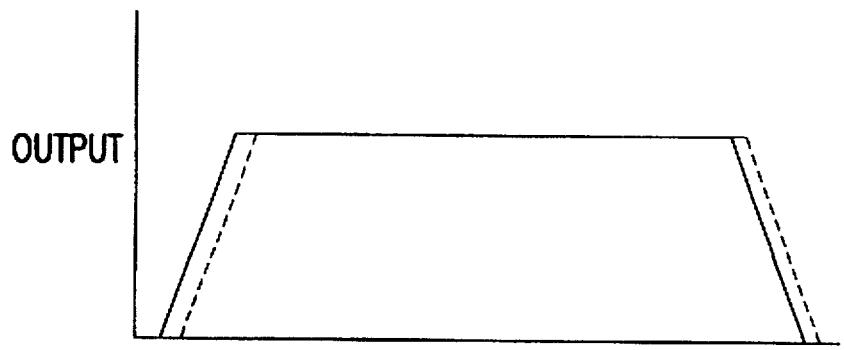

Because the internal structure of the focal detection component 20 is identical to the structure of the focal detection component 20 shown in FIG. 10, its explanation is omitted here. The reference numbers of FIG. 10 are cited below.

With respect to the correspondence between FIG. 1 and FIG. 3, generally, the field mask 1 corresponds to the field mask 91; the separator optical system 2 corresponds to the diaphragm mask 93 and the lens plate 94; the image sensor 3 corresponds to the image sensor 95; the light-receiving memory device 4 corresponds to an EEPROM (electrically erasable programmable read-only memory) installed in the microprocessor 21; the masking device corresponds to the "used pixel range masking function" of the microprocessor 21; and the focal detection device 6 corresponds to the "defocusing amount computing function" of the microprocessor 21.

Figure 5:
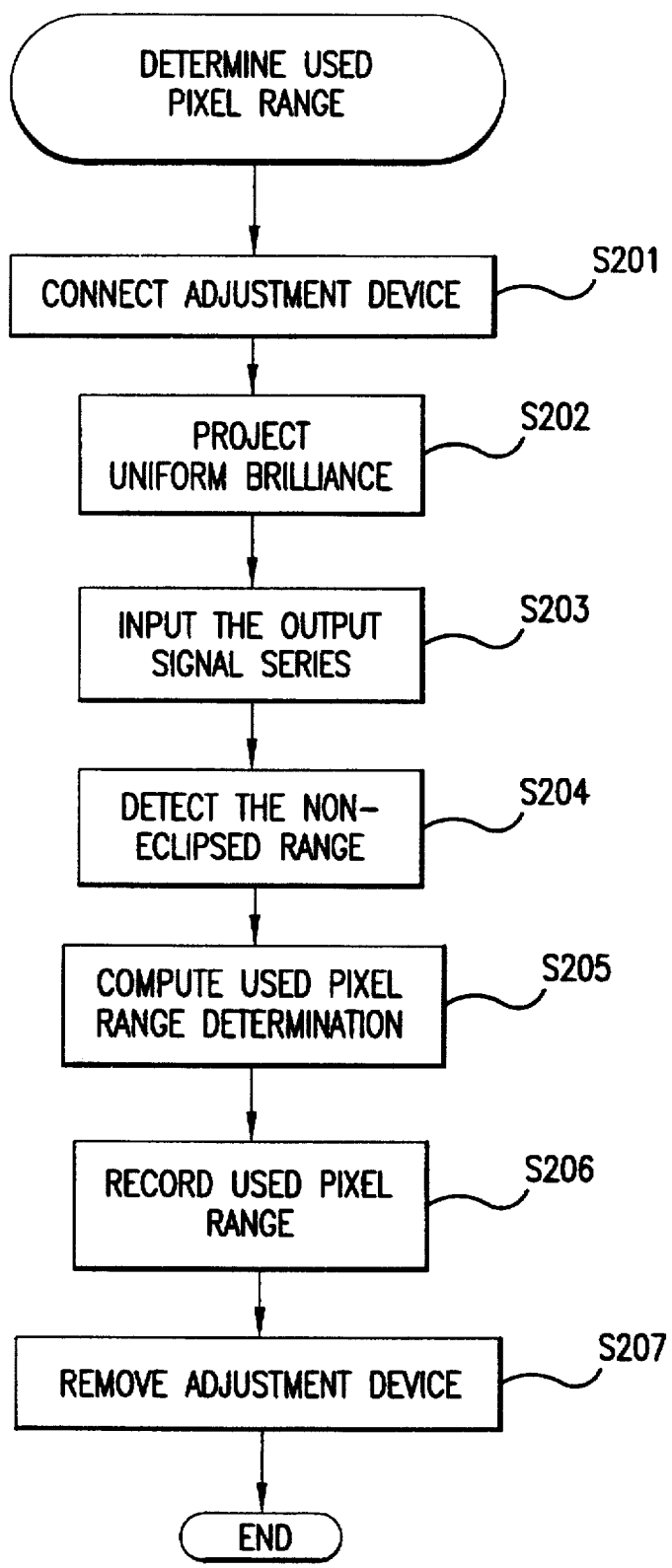
FIG. 5 is a flow chart that explains the adjustment process of the preferred embodiment of the invention.
Figure 6:
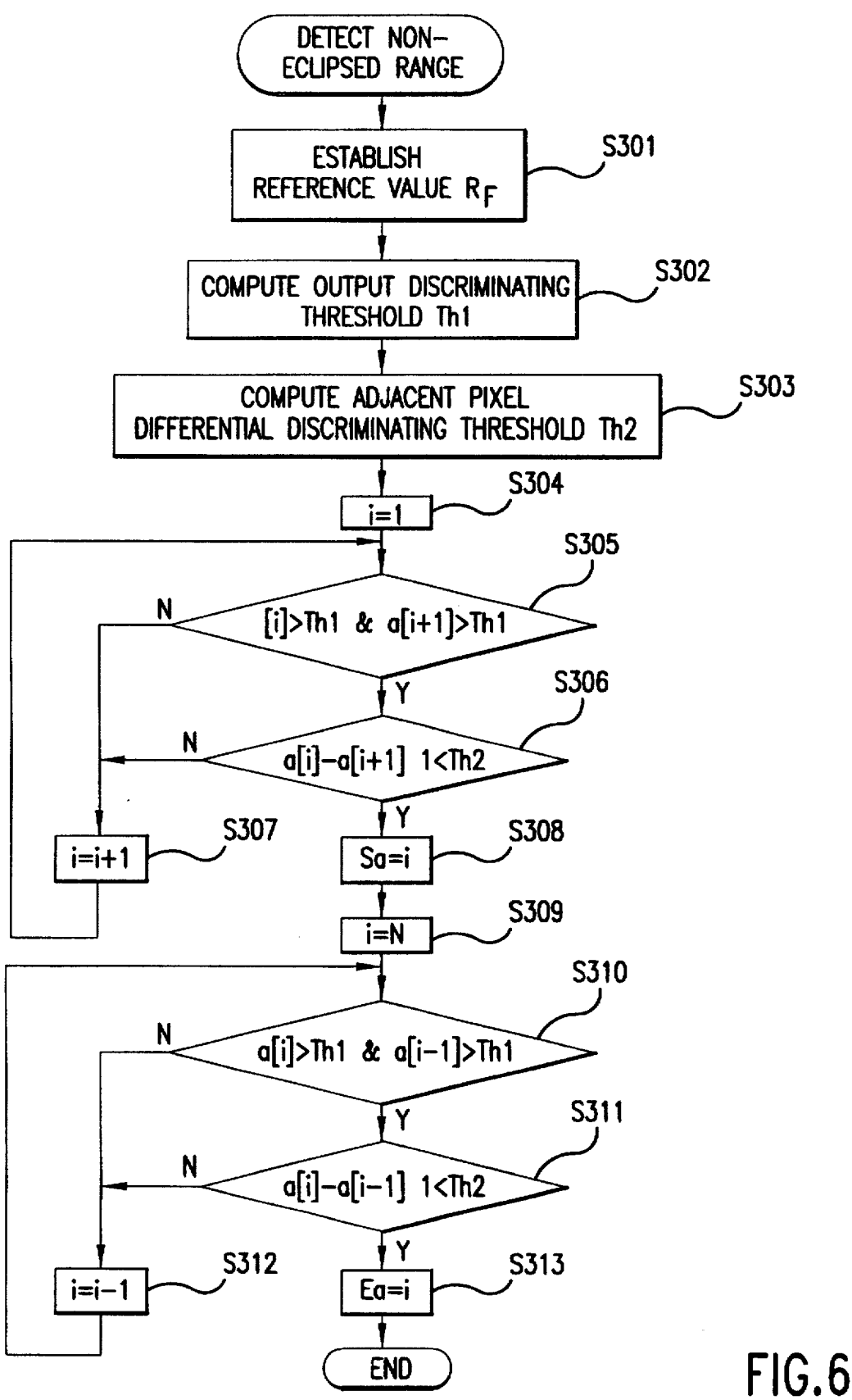
FIG. 6 is a flow chart that explains the operation of detecting the non-eclipsed range.

FIG. 5 is a flow chart that explains the adjustment process of the preferred embodiment of the invention. FIG. 6 is a flow chart that explains the operation of detecting the non-eclipsed range. The adjustment method of the preferred embodiment is explained below using these figures.

First, the adjustment device 30 is connected to the camera body 11 (Step S201). Next, light of uniform brilliance is projected onto the focal detection component 20 using the illumination device 33 or an integrating sphere and diffusion grating (Step S202).

In FIG. 4, the adjustment is performed when the photographic optical system is installed on the camera. However, the adjustment can be performed when the photographic optical system is removed from the camera.

The adjustment microprocessor 31 reads in the output signal series a[i] from the light-receiving element array 95a of the image sensor 95 via communication with the microprocessor 21 (Step S203), and detects the areas not incurring optical eclipse (henceforth called "non-eclipsed ranges") as shown in FIG. 6 (Step S204).

That is, the adjustment microprocessor 31 sets the reference value Rf according to the output signal series (Step S301). Here, the reference value Rf uses the maximum value of the output signal series, or it uses the average output value of the central part not incurring field mask eclipse.

Next, the adjustment microprocessor 31 computes the threshold value Th1 used in discriminating the size of the output signal series based on the reference value Rf. A threshold value Th1 to the extent of 70–90% of the reference value Rf is desirable (Step S302).

The adjustment microprocessor 31 computes the threshold value Th2 used in discriminating the differential of the adjacent pixels (light receiving areas) of the output signal series based on the reference value Rf. A threshold value Th2 to the extent of 4–8% of the reference value Rf is desirable (Step S303).

Next, the adjustment microprocessor 31 initializes to "1" the index number i of the photoelectrically converted pixels of the light-receiving element array 95a (Step S304). Then, the adjustment microprocessor 31 repeats the discrimination (Steps 305–307) while incrementing by 1 the index number i until both Equation (12) and Equation (13) become true as follows:

$$a[i] > Th1 \text{ and } a[i+1] > Th1 \quad (12)$$

$$|a[i]-a[i+1]| < Th2 \quad (13)$$

Figure 7:
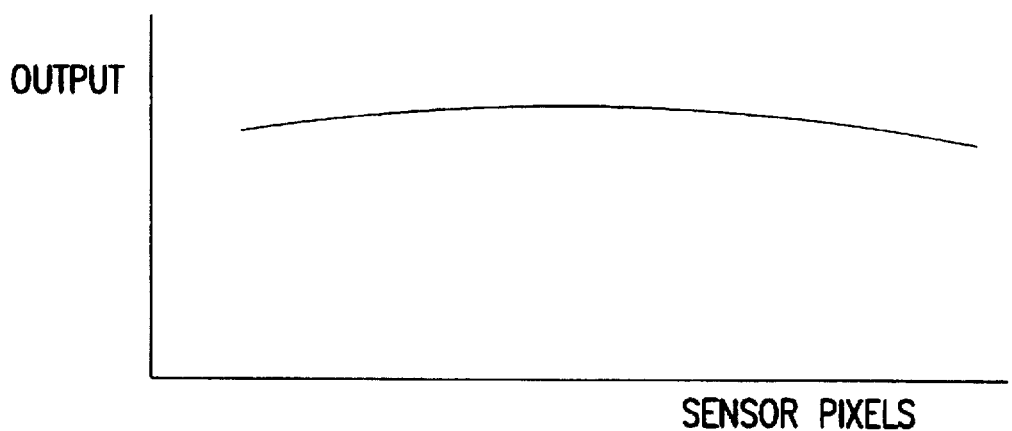
FIG. 7 is an explanatory drawing showing the change of luminance due to optical aberration.

When Equation (12) is not true, luminance changes drastically revealing the boundary of the field mask eclipse. Discriminating the size of the differential of the adjacent pixels distinguishes the smooth change in luminance due to aberration as shown in FIG. 7 and the drastic change in luminance due to field mask eclipse.

Consequently, the index number i at which both Equation (12) and Equation (13) first become true indicates the start of the non-eclipsed range of the light-receiving element array 95a. There, the adjustment microprocessor 31 records the index number i as the starting pixel Sa of the non-eclipsed range (Step S308).

Next, the adjustment microprocessor 31 sets the index number to the number of photoelectric conversion elements N of the light-receiving element array 95a (Step S309). Then, the adjustment microprocessor 31 repeats the discrimination (Steps 310–312) while decrementing by 1 the number i until both Equation (14) and Equation (15) become true:

$$a[i] > Th1 \text{ and } a[i-1] > Th1 \quad (14)$$

$$|a[i]-a[i-1]| < Th2 \quad (15)$$

Thus, the index number where both Equation (14) and Equation (15) first become true indicates the end of the non-eclipsed range in the light-receiving element array 95a. Thus, the microprocessor records the index number i as the ending pixel Ea of the non-eclipsed range (Step S313).

Such detection of the non-eclipsed range as shown in FIG. 6 is executed in the same manner regarding the light-receiving element array 95b. The starting pixel Sb and the ending pixel Eb of the non-eclipsed range are sought for the light-receiving element array 95b.

Next, the adjustment microprocessor 31 sets as the used pixel ranges the non-eclipsed ranges (Step S105 of FIG. 5). Then, the adjustment microprocessor 31 electrically records via the ROM writer 32 the values into the EEPROM installed in the microprocessor 21 (Step S106). At this point, the adjustment device 30 is removed from the camera body 11, and the adjustment process is ended.

Next, the operation of the focal detection apparatus adjusted as above are explained.

First, when the release button 11a is pressed halfway, the light-receiving element arrays 95a and 95b respectively undergo photoelectric conversion, and the output signal series a[i], . . . , a[n], and b[i], . . . . [n] are output to the microprocessor 21. The microprocessor 21 reads out from the EEPROM the starting pixels Sa and Sb and the ending pixels Ea and Eb, of the light-receiving element arrays 95a and 95b. Based on these values, the new output signal series a'[i] and b'[i] having deleted the parts incurring field mask eclipse are created as follows:

$$a'[i]=a[i+Sa-1] \text{ [however, } i=1 \sim (Ea-Sa+1)\text{]}$$

$$b'[i]=b[i+Sb-1] \text{ [however, } i=1 \sim (Eb-Sb+1)\text{]}$$

Using the output series a'[i] and b'[i] masked in this manner, the correlation computations of the Equations (1)–(5) mentioned above are performed, and the correlation C[L] is sought. The shift L providing the minimum value from the correlation C[L] computed as above is detected. The shift at this time corresponds to the amount of shift of the set of light images. The defocusing amount DF is computed by multiplying the conversion coefficient by this shift. Here, the correct defocusing amount DF may be computed using the Equations (6)–(10) mentioned above.

As explained above, in the adjustment method of the preferred embodiment, because uniform illumination is projected onto the image sensor 95 via the field mask, etc., it is possible to detect directly the condition of optical eclipse from the photoelectric output of the image sensor 95. Also, with the focal detection apparatus of the invention, it is possible to set correctly the computational bounds of the correlation computation according to the adjusted values written into the EEPROM.

Because there is no need to expand the aperture of the field mask 91 in order to prevent field mask eclipse, it is possible to prevent the generation of stray light, and the precision of focal detection can be planned. Also, because there is no need to increase the aperture of the field mask 91 beyond necessity, there is no longer the fear of one side of the set of light images intruding into the light-receiving element array of the other side, and it is possible to avoid situations where focal detection is impossible.

Further, because the proper computational bounds are established even when the product precision of the focal detection apparatuses is irregular, it is possible to lower the processing precision and assembly precision of the products to a reasonable level. Additionally, because there is no longer the need to unnecessarily restrict the computational bounds in consideration of the worst-case values of field mask eclipse, the scope of detection of the defocusing amount can be expanded properly without unnecessarily restricting the focal detection area.

In the preferred embodiment described above, the non-eclipsed ranges are used as they are as the used pixel ranges. However, the invention is not so limited. Two additional examples of methods of determining the used pixel ranges are explained.

Figure 8:
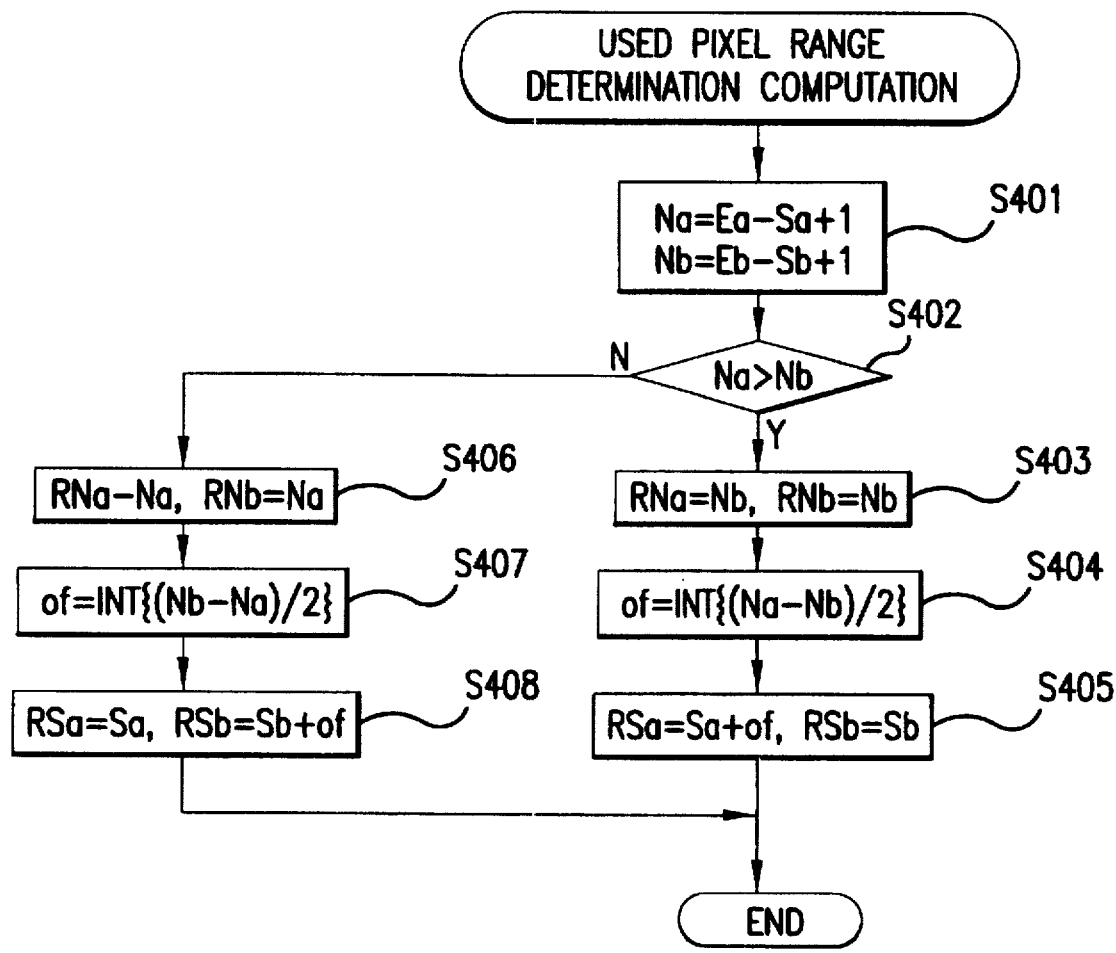
FIG. 8 is a flow chart that explains another method for adjustment.

FIG. 8 is a flow chart showing another method of determining the used pixel ranges.

First, using the starting pixels Sa and Sb, and the ending pixels Ea and Eb, of the light receiving element arrays 95a and 95b, the numbers of effective pixels Na and Nb of the light-receiving element arrays 95a and 95b are computed using Equations (20) and (21), respectively. (Step S401) as follows:

$$Na=Ea-Sa+1 \quad (20)$$

$$Nb=Eb-Sb+1 \quad (21)$$

Next, the numbers of effective pixels Na and Nb are size-discriminated (Step S402). When the value of Nb is smaller than the value of Na, the value of Nb is set as the numbers of used pixels RNa and RNb of the light-receiving element arrays 95a and 95b (Step S403) according to Equations (22) and (23) as follows:

$$RNa=Nb \quad (22)$$

$$RNb=Nb \quad (23)$$

Next, using the numbers of effective pixels Na and Nb, the offset value "of" is determined (Step S404) using Equation (24) as follows:

$$of=INT\{(Na-Nb)/2\} \quad (24)$$

Using these values, the used starting pixels Rsa and RSb of the light-receiving element arrays 95a and 95b are established according to Equations (25) and (26) as follows:

$$RSa=Sa+of \quad (25)$$

$$RSb=Sb \quad (26)$$

However, when the value of Na is smaller than the value of Nb (Step S402), the value of Na is set as the numbers of used pixels RNa and RNb of the light-receiving element arrays 95a and 95b (Step S406) according to Equations (27) and (28) as follows:

$$RNa=Na \quad (27)$$

$$RNb=Na \quad (28)$$

Next, using the numbers of effective pixels Na and Nb, the offset value "of" is determined (Step S407) using Equation (29) as follows:

$$of=INT\{(Nb-Na)/2\} \quad (29)$$

Using these values, the used starting pixels RSa and RSb of the light-receiving element arrays 95a and 95b are set according to Equations (30) and (31) as follows:

$$RSa=Sa \quad (30)$$

$$RSb=Sb+of \quad (31)$$

Both the above numbers of used pixels RNa and RNb and the used starting pixels RSa and RSb, are recorded in the EEPROM inside the microprocessor 21.

By such a method of determining the used pixel ranges, because the same value is used for both the number of used pixels of the light-receiving element array 95a and the number of used pixels of the light-receiving element array 95b, the computational bounds of the defocusing amount can be determined easily.

Figure 9:
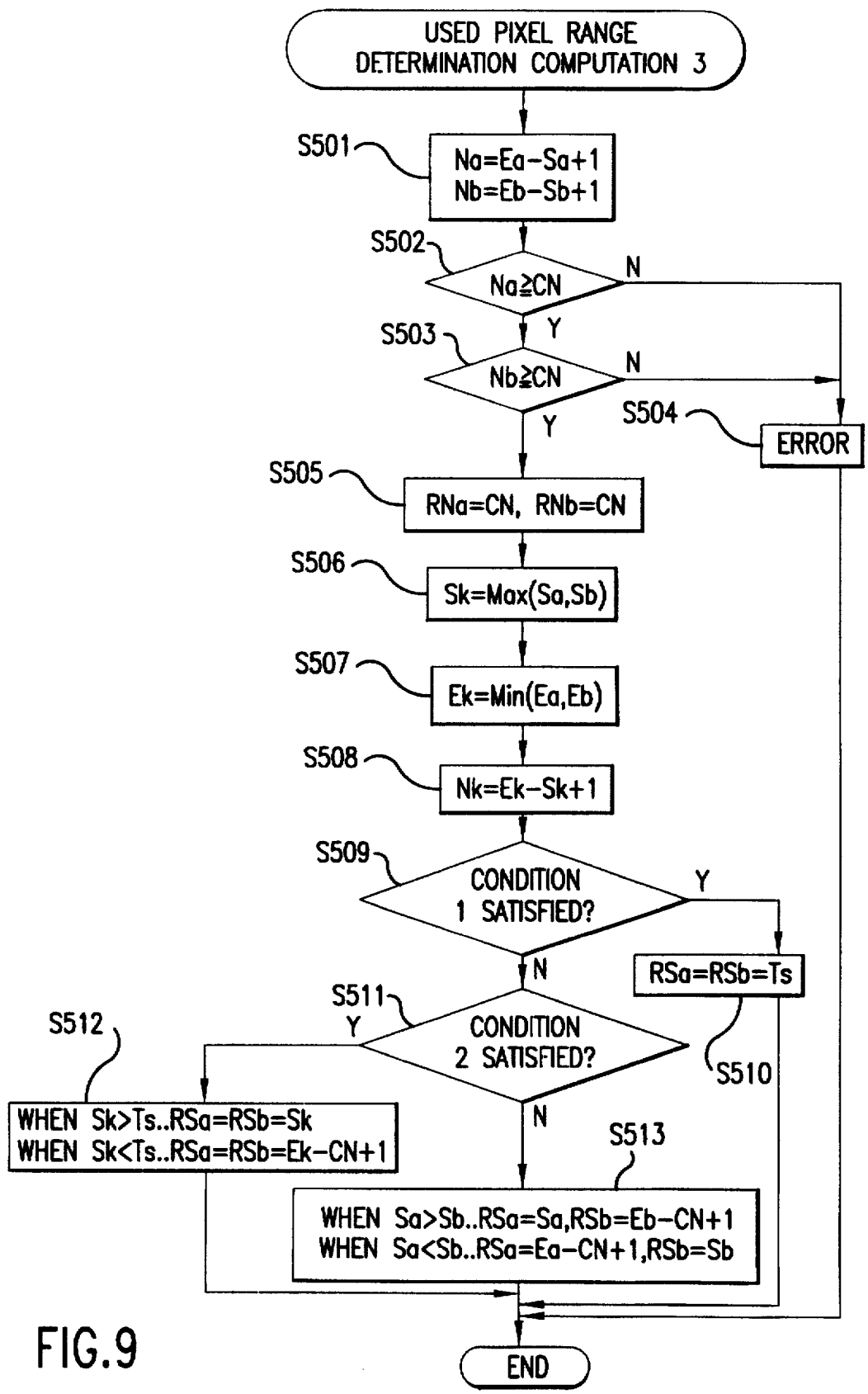
FIG. 9 is a flow chart that explains an additional method for adjustment.

FIG. 9 is a flow chart that explains an additional method of determining the used pixel ranges.

First, using the starting pixels Sa and Sb, and the ending pixels Ea and Eb, of the light-receiving element arrays 95a and 95b, the numbers of effective pixels Na and Nb of the light-receiving element arrays 95a and 95b are calculated (Step S501) using Equations (32) and (33) as follows:

$$Na=Ea-Sa+1 \quad (32)$$

$$Nb=Eb-Sb+1 \quad (33)$$

Whichever of these numbers of effective pixels Na or Nb is determined first, when either of these numbers is smaller than a number of pixels CN, because of poor product quality of the focal detection component 20, error display is performed (Step S502~S504), and the adjustment process is aborted.

Next, the value of the number of pixels CN is set as the numbers of used pixels RNa and RNb of the light-receiving element arrays 95a and 95b (Step S505) as set forth in Equations (34) and (35) below.

$$RNa=CN \quad (34)$$

$$RNb=CN \quad (35)$$

Here, using the starting pixels Sa and Sb, and the ending pixels Ea and Eb, of the light-receiving element arrays 95a and 95b, the common part of the effective pixels is sought (Steps S506~S507) using Equations (36) and (37) set forth below.

$$Sk=Max\{Sa, Sb\} \quad (36)$$

$$Ek=Min\{Ea, Eb\} \quad (37)$$

The number of pixels of this common part Nk is computed based on the following Equation (38) (Step S508) below.

$$Nk=Ek-Sk+1 \quad (38)$$

Next, it is determined whether Condition 1 is satisfied (Step S509) as follows:

Condition 1: $(Sk \leq Ts)$ and $(Ek \geq Ts+CN-1)$

In Condition 1, the number Ts is the starting pixel when the range of the number of pixels CN from the centers of the light-receiving element arrays 95a and 95b has been abstracted, and it becomes the following value.

$$Ts=INT\{(N-CN)/2\}+1 \quad (39)$$

When Condition 1 is satisfied as such, because the common part includes the range formed by the numbers of pixels of the centers of the light-receiving element arrays 95a and 95b, in order to make the range the used pixel range, the used starting pixels are set (step S510) according to Equations (40) and (41) as follow:

$$RSa=Ts \quad (40)$$

$$RSb=Ts \quad (41)$$

However, when Condition 1 is not satisfied, it is determined whether Condition 2 is satisfied as follows (Step S511).

Condition 2: $Nk \geq CN$

When Condition 2 is satisfied, it is possible to set the used pixel ranges from the common part. Thus, the used starting pixels RSa and RSb are set according to Equations (42)–(45) as follow so that the used pixel ranges of the light-receiving element arrays 95a and 95b are positioned in the middle as much as possible, and processing is ended (Step S512).

When $Sk<Ts$, $RSa=Ek-CN+1$ (42)

$$RSb=Ek-CN+1 \quad (43)$$

When $Sk>Ts$, $RSa=Sk$ (44)

$$RSb=Sk \quad (45)$$

When Condition 2 is not satisfied, it is not possible to make the number of pixels selected from the common pixels as the used pixel ranges. Thus, the used starting pixels RSa and RSb are set according to Equations (46)–(49) as follow so that the parts having the same pixel numbers overlap as much as possible, and processing is ended (Step S613).

When $Sa<Sb$, $RSa=Ea-CN+1$ (46)

$$RSb=Sb \quad (47)$$

When $Sa>Sb$, $RSa=Sa$ (48)

$RSb = Eb - CN + 1$            (49)

By such a method of determining the used pixel ranges, because the number of pixels of the used pixel ranges are taken in a specified number, the focal detection computations can be performed simply.

In the preferred embodiments described above, adjustment of the used pixel ranges was performed using an external adjustment device 30. However, the microprocessor 21 itself, for example, may perform computation of the used pixel ranges according to an interrupt signal indicating the starting of adjustment, and may replace them in the EEPROM. With such structure, the adjustment device 30 becomes unnecessary.

Also, the preferred embodiments include an EEPROM installed in the microprocessor 21. However, an EEPROM may be installed outside the microprocessor 21.

As explained above, the invention records an independent light-receiving area for each focal detection apparatus, and computes the defocusing amount with respect to the independent light-receiving area. Consequently, it is possible to eliminate the harm of field mask eclipse differing for each focal detection apparatus based on its independent light-receiving area.

Also, because there is no longer the need to avoid field mask eclipse by expanding the aperture of the field mask indiscriminately as in the conventional art, it is possible to reduce the occurrences of stray light and increase the precision of focal detection. Further, because there is no longer the risk of one side of the set of light images intruding into the light-receiving element array of the other side due to increasing the aperture of the field mask, it is possible to avoid focal detection becoming impossible.

Furthermore, because it is possible to set the light-receiving areas appropriately even when the product precision of the focal detection apparatus is irregular, it becomes possible to lower the fabrication precision and assembly precision of the products to a reasonable level. Additionally, because there is no longer the need to unnecessarily restrict the light-receiving areas in consideration of the worst-case conditions of field mask eclipse, it is possible to expand to the utmost the detectable scope of the defocusing amount without the focal detection area being unnecessarily restricted.

With the adjustment method of the invention, because uniform illumination is projected onto the image sensor via at least the field mask and the separator optical system, it is possible to detect directly from the photoelectric output of the image sensor the conditions of optical eclipse. Based on such detected conditions, it is possible to establish easily and correctly the light-receiving areas not receiving the influence of the optical eclipse. Consequently, there is no longer the need to avoid the field mask eclipse by expanding the aperture of the field mask beyond need, the occurrence of stray light is prevented, and the precision of focal detection is increased.

Also, there is no longer the risk of one side of the set of light images intruding into the light-receiving element array of the other side due to having expanded the aperture of the field mask of the focal detection apparatus, and the situation in which the focal detection becomes impossible is avoided. Further, because it is possible to set the proper light-receiving areas even when the product precision of the focal detection apparatus is irregular, it becomes possible to reduce the fabrication precision and assembly precision of the product to a reasonable level.

Also, because there is no longer the need to restrict the light-receiving areas beyond need, in consideration of the worst-case conditions of field mask eclipse, it is possible to expand to the utmost the detectable scope of the defocusing amount without the focal detection area being restricted beyond need.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focal detection apparatus for a photographic optical system, the focal detection apparatus comprising:

a field mask that blocks light outside of a focal detection area, the field mask being positioned adjacent a primary image-forming surface of the photographic optical system;

a separator optical system that divides a pupil of a beam of light transmitted through said field mask and that separately forms a set of light images of the divided beam of light;

an image sensor that converts the set of light images formed via said separator optical system into a photoelectric output, the image sensor comprising a plurality of light-receiving areas;

a light-receiving area memory device into which are written light-receiving areas not incurring optical eclipse when uniform illumination is projected onto said image sensor via said field mask and said separator optical system;

a masking device that masks the photoelectric output of said image sensor according to the light-receiving areas written into said light-receiving area memory device; and a focal computation device that detects a phase variation on the light-receiving areas related to the photoelectric output processed by said masking device and that computes a defocusing amount based on the phase variation.

2. An adjustment method of a focal detection apparatus for a photographic optical system, the focal detection apparatus including a field mask that blocks light outside of a focal detection area, the field mask being positioned adjacent a primary image-forming surface of the photographic optical system, a separator optical system that divides a pupil of a beam of light transmitted through said field mask and that separately forms a set of light images of the divided beam of light, an image sensor that converts the set of light images formed via said separator optical system into a photoelectric output, the image sensor including a plurality of light-receiving areas, a light-receiving memory device and a focal computation device that detects a phase variation on the light-receiving areas related to the set of images photoelectrically converted by said image sensor and that computes a defocusing amount based on the phase variation, the adjustment method adjusting the light-receiving areas of said image sensor and comprising the steps of:

projecting uniform illumination onto said image sensor via said field mask and said separator optical system;

determining the light-receiving areas not incurring optical eclipse based on the photoelectric output of said image sensor; and recording in the light-receiving memory device of the focal detection apparatus setting the light-receiving areas not incurring optical eclipse as the light-receiving areas of said image sensor.

3. The adjustment method of claim 2, wherein the step of determining the light-receiving areas not incurring optical eclipse includes incrementally discriminating a differential between adjacent light-receiving areas of said image sensor to identify the light receiving areas not incurring optical eclipse.

4. An adjustment device for use with a focal detection apparatus for a photographic optical system, the focal detection apparatus including a field mask that blocks light outside of a focal detection area, the field mask being positioned adjacent a primary image-forming surface of the photographic optical system, a separator optical system that divides a pupil of a beam of light transmitted through said field mask and that separately forms a set of light images of the divided beams of light, an image sensor that converts the set of light images formed via said separator optical system into a photoelectric output, the image sensor including a plurality of light-receiving areas, a light-receiving area memory device and a focal computation device that detects a phase variation on the light-receiving areas related to the set of images photoelectrically converted by said image sensor and that computes a defocusing amount based on the phase variation, the adjustment device adjusting the light-receiving areas of said image sensor and comprising:

a controller that receives output signals output by said image sensor and that determines light-receiving areas not incurring optical eclipse based on the photoelectric output of said image sensor; and a recorder that records in the light-receiving memory device of said photographic optical system the light-receiving areas not incurring optical eclipse as the light-receiving areas of said image sensor.

5. An focal adjustment method in a focal detection apparatus for a photographic optical system, the focal detection apparatus including a field mask that blocks light outside of a focal detection area, the field mask being positioned adjacent a primary image-forming surface of the photographic optical system, a separator optical system that divides a pupil of a beam of light transmitted through said field mask and that separately forms a set of light images of the divided beam of light and an image sensor that converts the set of light images formed via said separator optical system into a photoelectric output, the image sensor including a plurality of light-receiving areas, the method comprising:

storing in a light-receiving area memory device light-receiving areas not incurring optical eclipse when uniform illumination is projected onto said image sensor via said field mask and said separator optical system;

masking the photoelectric output of said image sensor according to the light-receiving areas stored in said light-receiving area memory device; and detecting a phase variation on the light-receiving areas related to the photoelectric output processed by said masking device and computing a defocusing amount based on the phase variation.

6. An adjustment device for a focal detection apparatus for a photographic optical system, the focal detection apparatus including a field mask that blocks light outside of a focal detection area, the field mask being positioned adjacent a primary image-forming surface of the photographic optical system, a separator optical system that divides a pupil of a beam of light transmitted through said field mask and that separately forms a set of light images of the divided beam of light, an image sensor that converts the set of light images formed via said separator optical system into a photoelectric output, the image sensor including a plurality of light-receiving areas, a light-receiving memory device and a focal computation device that detects a phase variation on the light-receiving areas related to the set of images photoelectrically converted by said image sensor and that computes a defocusing amount based on the phase variation, the adjustment device adjusting the light-receiving areas of said image sensor and comprising:

means for determining the light-receiving areas not incurring optical eclipse based on the photoelectric output of said image sensor when uniform illumination is projected onto said image sensor via said field mask and said separator optical system; and means for recording in the light-receiving memory device of the focal detection apparatus the light-receiving areas not incurring optical eclipse as the light-receiving areas of said image sensor.

7. A focal detection apparatus for a photographic optical system, the focal detection apparatus comprising:

field mask means for blocking light outside of a focal detection area, the field mask means being positioned adjacent a primary image-forming surface of the photographic optical system;

separator optical system means for dividing a pupil of a beam of light transmitted through said field mask and for separately forming a set of light images of the divided beam of light;

image sensor means for converting the set of light images formed via said separator optical system into a photoelectric output, the image sensor means comprising a plurality of light-receiving areas;

light-receiving area memory means for storing light-receiving areas not incurring optical eclipse when uniform illumination is projected onto said image sensor via said field mask and said separator optical system;

masking means for masking the photoelectric output of said image sensor according to the light-receiving areas written into said light-receiving area memory means; and focal computation means for detecting a phase variation on the light-receiving areas related to the photoelectric output processed by said masking device and that computes a defocusing amount based on the phase variation.

* * * * *